(No Model.)

J. F. LAWRENCE.
COMBINATION SCALE, WEIGHT TRAY, AND TWINE BOX.

No. 329,655. Patented Nov. 3, 1885.

WITNESSES:
A. P. Grant,
W. F. Kircher

INVENTOR:
J. Franklin Lawrence
BY John A. Wiedersheim
ATTORNEY.

UNITED STATES PATENT OFFICE.

J. FRANKLIN LAWRENCE, OF PHILADELPHIA, PENNSYLVANIA, ASSIGNOR TO JOHN LAWRENCE, OF SAME PLACE.

COMBINATION SCALE, WEIGHT-TRAY, AND TWINE-BOX.

SPECIFICATION forming part of Letters Patent No. 329,655, dated November 3, 1885.

Application filed January 24, 1885. Serial No. 153,830. (No model.)

*To all whom it may concern:*

Be it known that I, J. FRANKLIN LAWRENCE, a citizen of the United States, residing in the city and county of Philadelphia, State of Pennsylvania, have invented a new and useful Improvement in Weight Holders or Trays and Twine-Boxes for Scales, which improvement is fully set forth in the following specification and accompanying drawings, in which—

Figure 1:
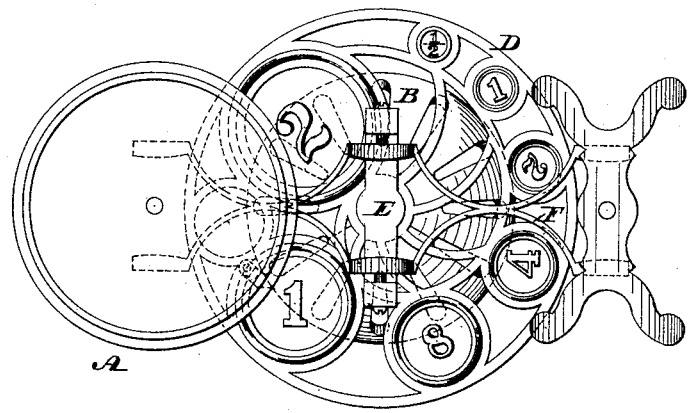
Figure 2:
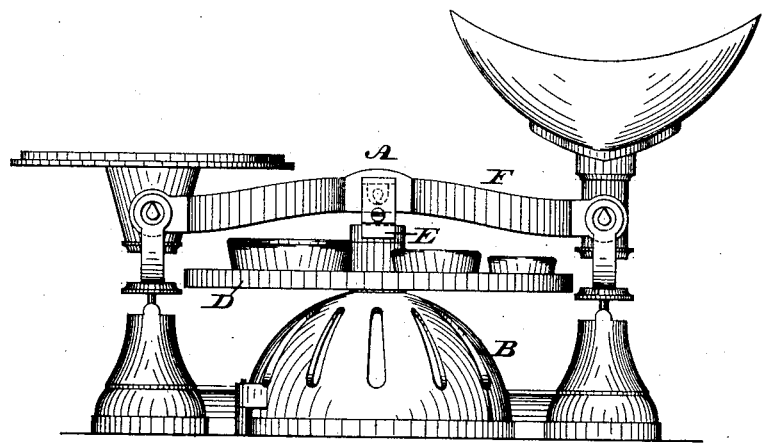
Figure 3:
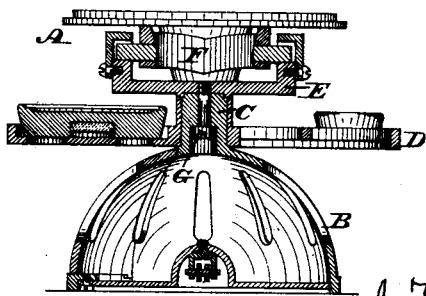

Figure 1 represents a top or plan view of a scale with a weight holder or tray and twine-box embodying my invention. Fig. 2 represents a side elevation thereof. Fig. 3 represents a vertical section thereof.

Similar letters of reference indicate corresponding parts in the several figures.

My invention consists of a novel and convenient tray or holder for the weights of a scale.

It also consists of a twine-holder combined with a tray or holder for the weights of a scale.

Referring to the drawings, A represents a scale, which, excepting the features of my invention, is of usual construction. Rising from the center of the base of the scale is a twine-box, B, at the top of which is an upright boss, C, which forms the axis or pivot for a rotating weight holder or tray, D, said boss also supporting the bearings E of the knife-edges of the scale-beam F, said bearings being connected with the boss by means of a screw or pin, G, which is passed through the boss and secured to said bearings, to which means of connection, however, I do not limit myself.

The tray D consists of a disk or plate having a series of depressions for the reception of the weights of a scale.

It will be seen that the tray occupies a position where it may be readily seen and conveniently rotated from either side of the scale in order to bring the desired weight within reach of the person using the scale. Furthermore, the space between the scale-beam and base of the scale is utilized to locate the tray without concealing or interfering with the scale-beam, the support for the tray being also utilized for sustaining the bearings of the scale-beam.

The twine-box is provided with a door, whereby access may be had to the interior of the same, said door being adapted to close with a snap, and thus remain shut, or may have any suitable fastening.

The stationary part of the twine-box is cast with the base of the scale, or may be secured thereto in any suitable manner, the former being preferred, it being noticed that the box occupies a space below the tray and the base of the scale without interfering with either parts of the scale or tray, both the combined weight holder or tray and twine-box and combined weight holder or tray, twine-box, and scale having their parts compactly arranged and constructed in a strong and durable manner, presenting themselves most conveniently for access and service.

I am aware that scales have been constructed having a weight-holder therewith, and such I do not broadly claim.

Having thus described my invention, what I claim as new, and desire to secure by Letters Patent, is—

1. A scale formed with a vertical pivot, in combination with a rotary weight-tray which is centrally mounted on said pivot, substantially as and for the purpose set forth.

2. A scale, in combination with a rotary weight-tray and a vertical pivot which supports the bearings of the scale-beam and forms the axis for said tray, which is centrally mounted thereon, substantially as described.

3. A rotatable weight holder or tray, in combination with a twine-box which is provided with an axis for said tray, substantially as and for the purpose set forth.

4. A scale and a rotatable weight-holding tray, in combination with a twine-box having an axis for said tray and supporting the bearings of the scale-beam, substantially as and for the purpose set forth.

5. A scale provided with a rotatable weight-holding tray, connected therewith and located below the scale-beam, substantially as and for the purpose set forth.

6. A scale provided with a weight-holding tray and a twine-box, both connected therewith and located below the scale-beam, substantially as and for the purpose set forth.

J. FRANKLIN LAWRENCE.

Witnesses:
JOHN A. WIEDERSHEIM,
W. F. KIRCHER.